J. & J. C. Holyland,
Cracker Machine,
N° 30,732. Patented Nov. 27, 1860.
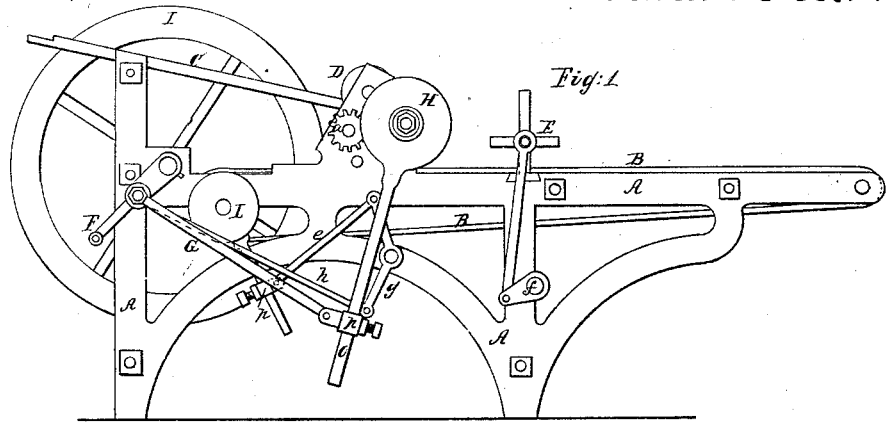
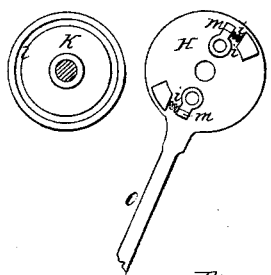
Fig. 3.
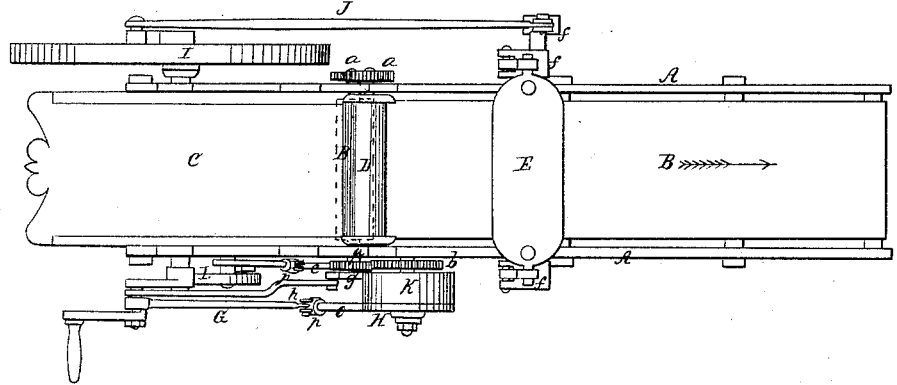
Fig. 2.
Witnesses
J. Fraser
S. J. Allis
Inventor
J. Holyland
J. C. Holyland

UNITED STATES PATENT OFFICE.

J. HOLYLAND AND J. C. HOLYLAND, OF ROCHESTER, NEW YORK.

CRACKER-MACHINE.

Specification of Letters Patent No. 30,732, dated November 27, 1860.

*To all whom it may concern:*

Be it known that we, J. HOLYLAND and J. C. HOLYLAND, of the city of Rochester, in the county of Monroe and State of New York, have invented a new and useful Improvement in Cracker-Machines; and we do hereby declare that the following is a full and exact description thereof, reference being had to the accompanying drawings, making part of this specification, in which—

Figure 1 is a front elevation of the side of our machine. Fig. 2 is a plan view of the same. Fig. 3 is a separate view of the lever and clutch-box H, K, the parts being shown reversed to represent the interior.

Like letters designate corresponding parts in all of the figures.

Our improvement relates to the manner of feeding the dough to the cutters, and the regulation of the feeding to compensate for the different degrees of shrinkage possessed by different kinds of dough, and the adaptation of the feed to the requirements of different sizes of cutters.

As represented in the drawings, A A indicate the frame of the machine, B B the feeding apron, C the inclined table, on which the dough is placed previous to being prepared by the rollers D D, for being cut for baking by the form of cutters E. The parts are put in motion by turning the crank F, to which is pivoted the connecting rod G, the opposite end of which is attached to the arm or lever of the clutch-box H, by which motion is imparted to the rollers D, through suitable gears. The opposite end of the crank shaft is provided with a fly-wheel I, to a crank pin on one of the arms of which, the rod J, connects with a lever on the rock-shaft $f$, which, by means of a short crank and rod at each end connected with the form of dies, produces the reciprocating motion by which the dough is cut. Motion is given to the feed apron B, by a second connecting rod $h$, attached to the crank F, at the same point with rod G, and operating the roller by which the feed apron is moved by means of a clutch L, the arm of which is connected by a rod $e$ to the vibrating yoke $g$, to the opposite end of which rod $h$ is also attached.

The prepared dough, being placed on the inclined table C, is seized by the rollers and drawn between them, by which it is pressed into a sheet of the thickness required, which falls on the feed apron and is carried under the cutters. The motion both of the rollers and the feed apron is intermittent; the latter moving just far enough to supply the cutters with as wide a portion as they will cut at a stroke; the feed motion stopping so that the dough is at rest when the cutters descend upon it. The rollers revolve far enough to press, at each movement, as large a portion of the dough as is required to supply the cutters for one stroke, when their motion is suspended while the stroke is being made. The supplying of the dough to the cutters in the right quantity, so that each successive cutting will be perfect in itself, neither overreaching the last, and making the forms of the crackers imperfect, nor falling short and leaving a portion of the dough uncut, is a point of great difficulty, owing to the inequality in the shrinkage of different batches of dough. From the greater proportion of gluten in some specimens of flour than in others, and partly perhaps to the temperature, and other causes which it is difficult to assign, the dough will at times shrink very much as the sheet leaves the rollers, and at other times much less. In the machines heretofore used the motion of the rollers which press the dough has been continuous, supplying the dough uniformly to the apron, while the amount supplied to the cutters was regulated by the intermittent movement of the apron. But owing to the inequality in the shrinkage of different batches, it was a constant source of annoyance to adjust the feed so that the machine would work properly. The means relied on was to regulate the speed of the rollers, so as to pass more or less dough to each stroke of the cutters as the case required. This was done by changing the gear pinions by which the rollers were driven from the shaft of the crank when the power was applied. This necessitated the having of a numerous supply of gear pinions, and the time occupied in changing and experimenting was considerable, besides which the regulation was at best imperfect, as a variation equal only to the fraction of a tooth of the gears would soon be so increased by its repetition on the feed of the apron as to make the variation very considerable. We have effectually obviated this difficulty by making the rollers D D, work intermittently, and by regulating the intervals of their motion very perfectly by the clutch H, and connecting rod G. The clutch consists of a box H, K, the latter fixed on its journal, and attached to the gear pinion b, which drives the pinions a a which connect the rollers D D. The front plate H, turns on the journal of K, and has on its inner face two dogs m m which are pivoted, and provided with square projections which take into the groove l of K. As the plate H, is turned in one direction by the lever handle O, the dogs bind in the groove and cause the part K, to turn also; but when the motion is reversed the pressure of the spiral springs i i throws the dogs in a line with the groove and they slide easily. Thus the intermittent motion is got from the crank and communicated to the rollers. The regulation of this motion is obtained by simply moving the connection of the rod G, to or from the center or axis of the clutch. This is easily done by loosening the set screw in the box p, and sliding it on the rod O. By this simple arrangement the quantity of dough pressed at each movement of the rollers can be adjusted accurately to the requirements of the cutters, so as to compensate in the nicest manner for the shrinkage. It is also equally convenient to adjust by the same means, to the different sizes of cutters used. It reduces the machine to such a degree of simplicity in its management that no mechanical skill is required on the part of the attendant, nor is it possible for his ignorance to derange its working.

It should be borne in mind that the adjustment of the rollers is entirely independent of that of the feed apron, though the motion of the latter is obtained and regulated in a similar manner by the clutch L.

What we claim as our invention and desire to secure by Letters Patent is—

Giving an intermittent motion to the pressure rollers D D, by means of the clutch and lever H, O, connecting rod G, and crank F, or their equivalents, substantially in the manner and for the purposes shown and described.

J. HOLYLAND.
J. C. HOLYLAND.

Witnesses:
J. Fraser,
S. J. Allis.